(12) United States Patent
Wu et al.

(10) Patent No.: US 11,057,967 B2
(45) Date of Patent: Jul. 6, 2021

(54) RADIO FREQUENCY HEATING SYSTEM WITH TEMPERATURE MEASURING COMPONENT BASED ON FLUORESCENCE

(71) Applicant: Shanghai GND eTech Co., Ltd., Shanghai (CN)

(72) Inventors: Zhiwei Wu, Shanghai (CN); Liansheng Cao, Shanghai (CN); Qiujin Wang, Shanghai (CN)

(73) Assignee: SHANGHAI GND ETECH CO., LTD., Shanghai (CN)

( * ) Notice: Subject to any disclaimer, the term of this patent is extended or adjusted under 35 U.S.C. 154(b) by 304 days.

(21) Appl. No.: 16/174,388

(22) Filed: Oct. 30, 2018

(65) Prior Publication Data

US 2019/0132909 A1    May 2, 2019

(30) Foreign Application Priority Data

Oct. 30, 2017  (CN) .......................... 201711037729.6

(51) Int. Cl.
*H05B 6/64*     (2006.01)
*G01K 11/3213*  (2021.01)
*H05B 6/68*     (2006.01)

(52) U.S. Cl.
CPC ....... *H05B 6/6452* (2013.01); *G01K 11/3213* (2013.01); *H05B 6/645* (2013.01); *H05B 6/68* (2013.01)

(58) Field of Classification Search
CPC ........ H05B 6/6452; H05B 6/645; H05B 6/68; H05B 6/6447; H05B 6/6467; H05B 6/402; H05B 6/70; H05B 6/707; H05B 6/708; G01K 11/3213

See application file for complete search history.

(56) References Cited

U.S. PATENT DOCUMENTS 6,649,888 B2    11/2003  Ryan et al.
2018/0220499 A1  8/2018  Sims et al.

FOREIGN PATENT DOCUMENTS

CN      102401703 B   *  4/2013
JP      2004020077 A  *  1/2004
WO   WO-2013033330 A2  *  3/2013  ........... H05B 6/6482

* cited by examiner

*Primary Examiner* — Dana Ross
*Assistant Examiner* — Rachel R Rizzo
(74) *Attorney, Agent, or Firm* — Yong Chen

(57) ABSTRACT

A radio frequency heating system includes a radio frequency heating chamber, a fluorescence temperature measuring transmitter, and a central control unit connected to the fluorescence temperature measuring transmitter. A radio frequency heating container is arranged at the bottom of the radio frequency heating chamber. The radio frequency heating container comprises a fluorescent material with temperature-sensitive fluorescent characteristics, which is excitable by excitation light to produce fluorescence. A light path is provided between the radio frequency heating container and the fluorescence temperature measuring transmitter. The fluorescence temperature measuring transmitter includes a light emitting device for generating excitation light and a driving circuit thereof, a photoelectric converter device for receiving fluorescence, and a signal processing and output circuit for processing output signals of the photoelectric converter device.

9 Claims, 3 Drawing Sheets

RADIO FREQUENCY HEATING SYSTEM WITH TEMPERATURE MEASURING COMPONENT BASED ON FLUORESCENCE

CROSS-REFERENCE TO RELATED APPLICATION

This application claims priority to Chinese Application No. 201711037729.6, filed Oct. 30, 2017, the disclosure of which is incorporated by reference herein in its entirety.

TECHNICAL FIELD

The invention belongs to the technical field of temperature measurement and control, in particular to a radio frequency heating system with temperature measuring component based on fluorescence, and a radio frequency heater.

BACKGROUND ART

Radio Frequency, or RF in short, is a high-frequency alternating current electromagnetic wave with frequencies ranging from around twenty thousand times per second (20 kHz) to around three hundred billion times per second (300 GHz) including microwave. When certain radio frequency penetrates the inside of the object, the electric energy can be converted to heat energy by exciting the electro-ion migration inside the object, thereby heating the object. The operating mechanism is based on the strong absorbance of the radio frequency energy by the medium. For example, microwave oven is one of them. It uses water molecules to absorb microwave energy to achieve the purpose of heating the object being heated.

Conventional temperature sensors, such as thermocouples and thermal resistors, are made of metal conductive materials. Conductive materials produce inductive current in high frequency electromagnetic fields due to electromagnetic induction. As a result, they may discharge or their own temperature may rise, which seriously affect the temperature measurement and cause errors in temperature indication, or make it impossible to carry out stable temperature measurement. In current techniques, infrared temperature measurement can be used for temperature measurement in the radio frequency environment, but it has certain limitations. The measured temperature point must be within the line-of-sight of the infrared sensor, and the infrared temperature measurement can only measure the surface temperature of an object. The accuracy of infrared temperature measurement is affected by the emissivity of the material on the surface of the object. Different materials of the object under test have different infrared emissivity and different temperature values.

SUMMARY OF INVENTION

The present disclosure provides systems and methods for fluorescence temperature measurement which can overcome some shortcomings of the existing technologies. For example, in the measurement, a fluorescent material can be contacted with the object to be measured, the excitation light source can be input from a distal end of an optical fiber, and the excitation light is transmitted to the proximal end of the optical fiber to activate the fluorescent material. After the activation, the fluorescent afterglow of the fluorescent material is transmitted back from the optical fiber. The fluorescence spectrum thus obtained is filtered and the time decay of the fluorescent glowing is measured, by which the temperature of the measured object can be calculated.

In one aspect, the invention provides a radio frequency heating system which includes a radio frequency heating chamber, a fluorescence temperature measuring transmitter and a central control unit, said central control unit being connected to said fluorescence thermometer transmitter.

According to some embodiments of the system, a radio frequency heating container is disposed at the bottom of the radio frequency heating chamber. The radio frequency heating container comprises a fluorescent material having temperature sensitive fluorescent characteristics, said fluorescent material can generate fluorescence when excited by an excitation light. A working optical path exists between said RF heating container and said fluorescent temperature measuring transmitter.

According to some embodiments, the fluorescence temperature measuring transmitter comprises a light emitting device for generating the excitation light and a driving circuit thereof, an optoelectronic converter component for receiving said fluorescence, and a signal processing output circuit for processing output signals of the optoelectronic converter component.

The central control unit is used for feedback control of said radio frequency heating system according to the temperature measured by the fluorescence temperature measuring transmitter.

In some embodiments, said fluorescence temperature measuring transmitter is located below said radio frequency heating container and transmits the light signal through the working optical path.

In some embodiments, said radio frequency heating system also includes a light guide for transmitting light signals between the radio frequency heating container and the fluorescence temperature measuring transmitter. The light guide can be made of a solid light conducting material.

In some embodiments, said radio frequency heating chamber includes a radio frequency generator for generating radio frequency energy and a radio frequency waveguide for transmitting the radio frequency energy.

In some embodiments, said radio frequency heating container contains a fluorescent material.

In some embodiments, said fluorescent material is distributed on the surface of the radio frequency heating container.

In some embodiments, one end of the light guide extends into the cavity of the radio frequency heating chamber and is connected to the bottom of the radio frequency heating container, and the other end of the light guide is connected to the fluorescence temperature measuring transmitter.

In some embodiments, said driving circuit of the light emitting device controls the light output mode of the excitation light by controlling one or more of the intensity, frequency, wavelength or waveform of the excitation light.

The invention also provides a radio frequency heater for heating an article. The heater includes the radio frequency heating system with a fluorescent temperature sensor described herein. The central control unit of said radio frequency heating system is connected to a control panel of the radio frequency heater.

By including a fluorescence temperature measuring device in the radio frequency heating system, adopting the fluorescence temperature measuring method and utilizing the fluorescence temperature characteristics, the invention realizes the non-contact temperature measurement of the heated objects/articles, and can accurately detect the temperature of the objects to be heated or being heated in the radio frequency heating container and control the temperature well.

BRIEF DESCRIPTION OF DRAWINGS

By reading and consulting the detailed descriptions of the non-limiting embodiments described by the following figures, the additional features, objectives and advantages of the present invention will be more apparent.

DETAILED DESCRIPTION OF PREFERRED EMBODIMENTS

In order to make the purpose, technical scheme and advantages of the invention more clear, the technical scheme of the invention is described below in combination with the drawings and their embodiments.

The RF heating system described herein is based on the temperature-dependent characteristics of fluorescence. In some embodiments, the system adopt optical waveguide coupling or spatial optical coupling to make the electronic components of the temperature measurement removed from RF environment. Using the RF heating container itself as the temperature detection point makes a traditional temperature probe unnecessary.

Figure 1:
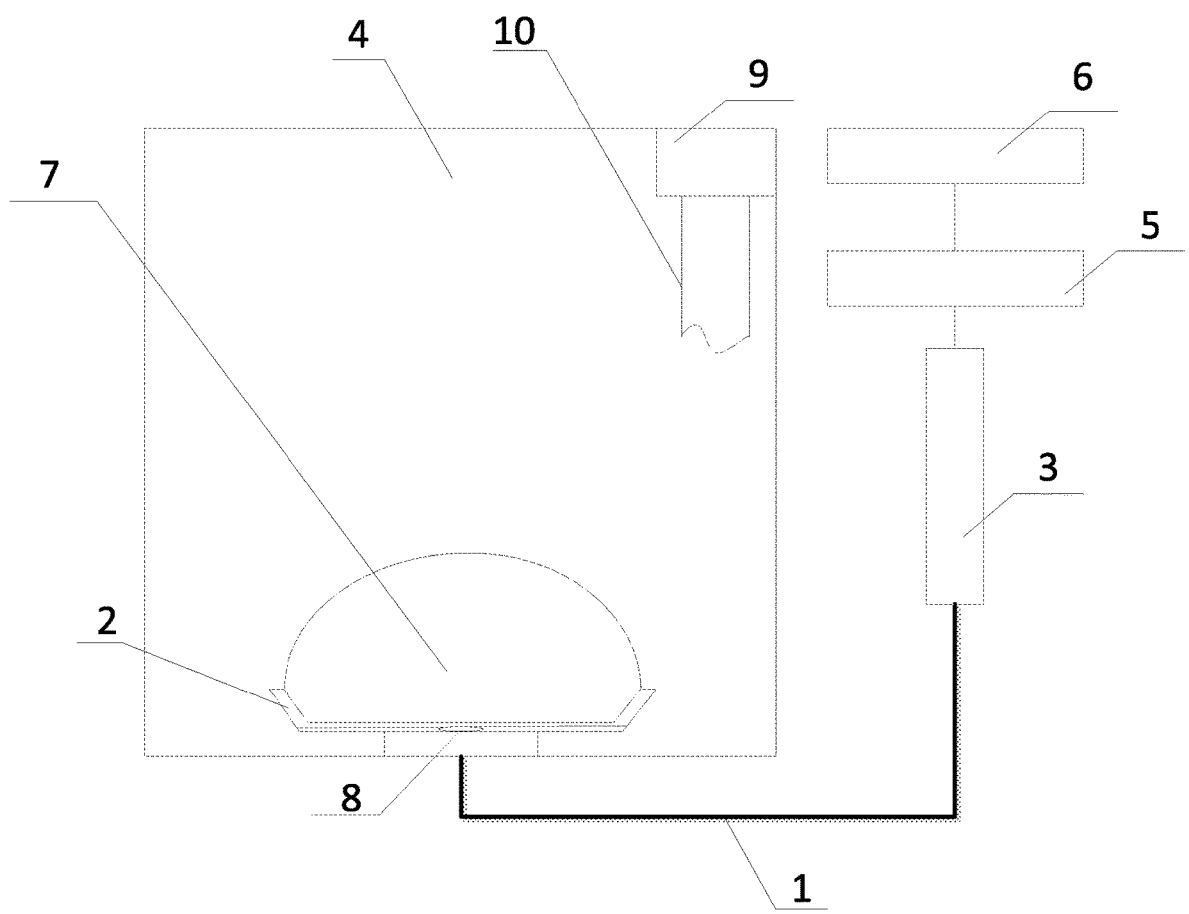
FIG. 1 is a schematic diagram of a radio frequency heating system with a fluorescent fiber optic temperature sensor according to one embodiment of the present invention.

FIG. 1 shows one schematic diagram of such a radio frequency heating system with a fluorescent fiber optic temperature sensor according to an embodiment of the present invention. The details will be explained by FIG. 1. Specifically, the radio frequency heating system includes a radio frequency heating chamber, light guide 1, a radio frequency heating container 2, a fluorescence temperature measuring transmitter 3, and a central control unit 5. The object 7 placed in the RF heating chamber 4 is heated by means of RF heating, and the light guide 1 is used for transmitting light signals, which can be designed in any shape and length as needed. The fluorescence thermometer transmitter/fluorescence temperature measuring transmitter 3 can detect the temperature in the RF heating chamber 4. Further, the central control unit can be realized by a digital signal processor, a special purpose integrated circuit, a field programmable gate array or other programmable logic components, hardware components (such as registers and FIFO), a processor executing a series of firmware instructions, and an operating software, or any combination of components above.

A RF heating container 2 is arranged at the bottom of the RF heating chamber for holding the object to be heated or being heated. The RF heating chamber comprises an upper portion which can accommodate the heated object, preferably made of a high-temperature resistant food grade material, and the bottom of the RF heating container 2 can be permanently fixed or detachedly fixed at the bottom of the RF heating chamber. Further, the central control unit is connected to the fluorescence temperature measuring transmitter 3 for feedback control of the radio frequency heating system according to the temperature measurement result. It should be noted that the RF heating container 2 and the fluorescence thermometer transmitter 3 are spatially independent of each other. In the preferred embodiment illustrated in FIG. 1, the RF heating container 2 is placed at the bottom of the heating chamber, and the fluorescence thermometer transmitter 3 is disposed outside the RF heating chamber. Further, the RF heating container 2 contains a fluorescent material having a temperature-sensitive fluorescent property, and is excitable by an excitation light to produce fluorescence. It is understood by those skilled in the art that a fluorescent substance can be stimulated to emit fluorescent energy at a certain wavelength. After the excitation is removed, the duration of fluorescent afterglow depends on the characteristics of fluorescent substances, including environmental temperature and other factors. This stimulated fluorescence decays exponentially generally. The decay time constant is also referred to as fluorescence lifetime or fluorescence afterglow time. Under different ambient temperatures, the fluorescence lifetime is also different. Therefore, by measuring the length of the fluorescence lifetime, one can determine the temperature of the location of the fluorescent material. Further, a working light path is provided between the RF heating container 2 and the fluorescence temperature measuring transmitter 3 to realize the transmission of light signals between the RF heating container 2 and the fluorescence temperature measuring transmitter 3. In the present invention, the radio frequency heating container 2 is in direct contact with the heated object 7 to sense the temperature information of the object. The radio frequency heating container 2 acts as a temperature probe while serving as a container. Further, as shown in FIG. 1, the light path transmits the fluorescence signals provided by the radio frequency heating container 2 containing the temperature information of the heated object 7 through the light guide 1, and the fluorescence thermometer transmitter 3 demodulates the fluorescence signals into electrical signals, and finally realizes digital output, which will be described in more detail in the following embodiments.

Figure 1A:
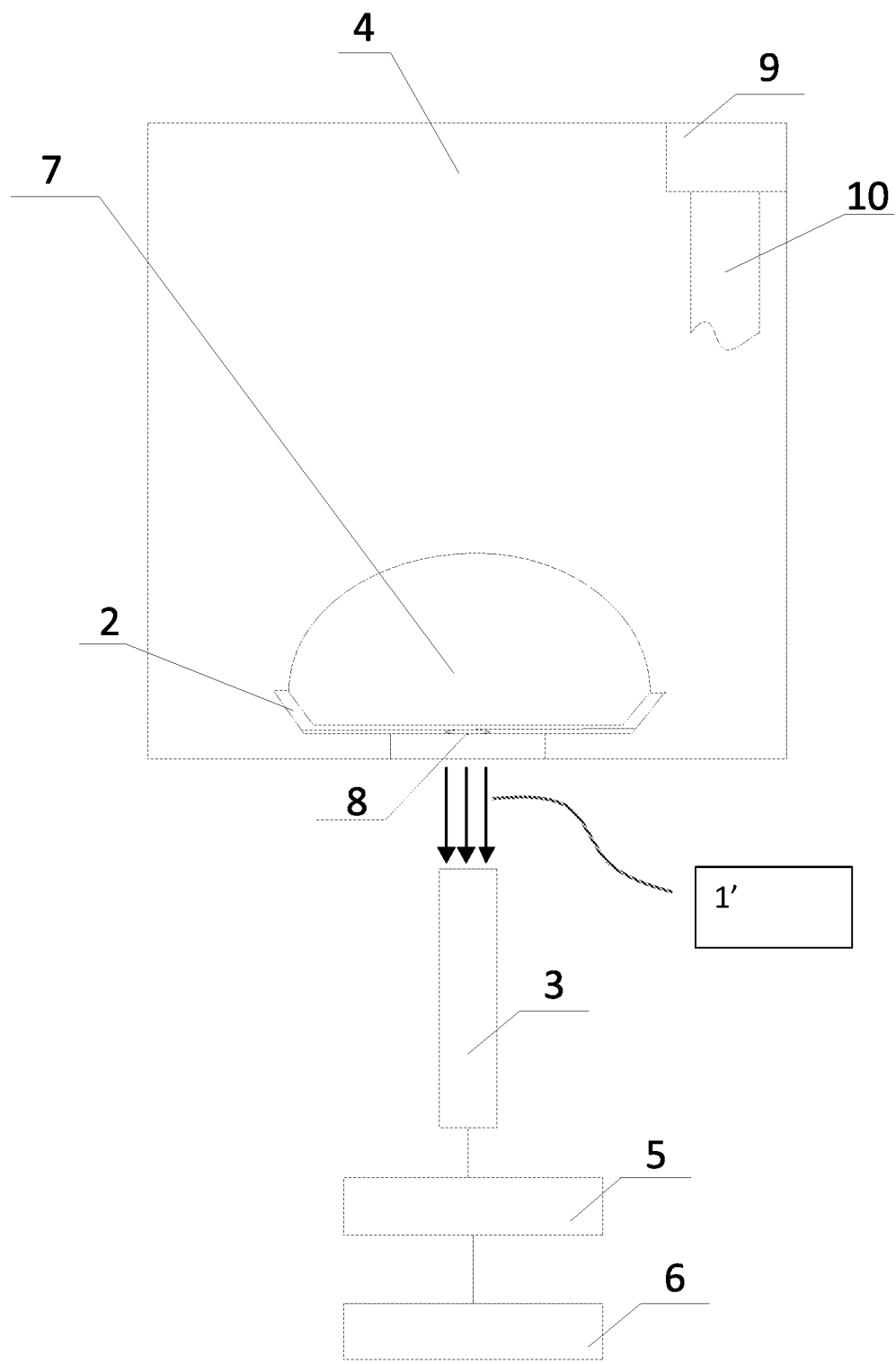
FIG. 1A is a schematic diagram of a radio frequency heating system with a fluorescent fiber optic temperature sensor according to an alternative embodiment of the present invention.

Further, the light guide 1 can be made of a solid material with good light transmitting characteristics, preferably material with high temperature and electrical insulation properties. In some embodiments, the light guide 1 can comprise one or more fiber optics (or optical fibers). Such fiber optics can have a core and a shell having a lower refraction index to allow light to be transmitted therein through total internal reflection. As shown in FIG. 1, the light guide 1 is connected to the fluorescent temperature measuring transmitter 3 at a distal end. The other end (the proximal end) is affixed at the bottom of the RF heating container 2, preferably at the center of the bottom 8 and facing toward the bottom of the radio frequency heating container 2 in order to transmit excitation light and fluorescence signals. It should be noted that the light guide 1 can be made into various shapes and arranged in any ways as needed. In other embodiments, the light guide 1 can be omitted, and space is used as the working optical path to transmit light signals directly between the RF heating container 2 and the fluorescence temperature measuring transmitter 3 (the working optical path 1' is shown in FIG. 1A).

Figure 2:
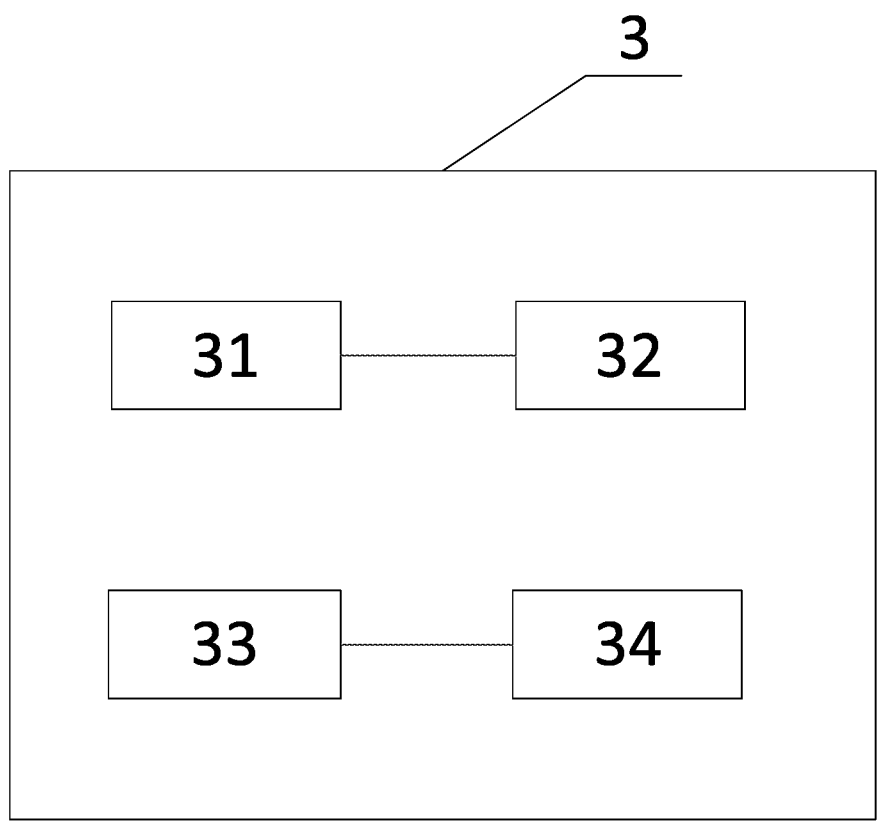
FIG. 2 is a schematic diagram of a fluorescence temperature measuring transmitter 3 according to one embodiment of the present invention.

Further, FIG. 2 shows a schematic diagram of a fluorescence temperature measuring transmitter 3 according to one embodiment of the present invention. The fluorescence temperature measuring transmitter 3 includes a light emitting device 31 for generating excitation light and a driving circuit 32 thereof, an optoelectronic converter device 33 for receiving fluorescence, and a signal processing output circuit 34 for processing output signals of the optoelectronic converter device. The light emitting device is preferably a light-emitting diode and the optoelectric converter is preferably a photodiode. The light-emitting device converts electric energy into light energy to emit the excitation light as driven by the driving circuit of the light-emitting device and illuminates the bottom of the RF heating container 2 through the light path. The fluorescent material contained in the RF heating container 2 generates fluorescence under the irradiation of the excitation light, which is transmitted from the proximal end of the light guide 1 through the light guide 1, and reaches the photoelectric converter device at the distal end of the light guide 1, which generates the corresponding electrical signals. The electrical signal contains temperature information at the location of the fluorescent material, and are processed by the signal processing output circuit. In this manner, the temperature can be accurately calculated according to the temperature characteristic of the fluorescent material.

It will be understood by those skilled in the art that, by using the light guide 1 as the transmission medium of the light signal, and taking advantage of the variability of the shape and arrangement of the light guide 1 itself, the position of the fluorescence thermometer transmitter 3 is not limited to the bottom or side of the radio frequency heater. The fluorescence temperature measuring transmitter 3 could be arranged in any position outside the RF heating chamber. The central control unit is connected to the temperature measuring transmitter 3, thereby realizing accurate temperature measurement and feedback control of the heated object by the fluorescence temperature method, and outputting and displaying through corresponding output device.

Further, the bottom of the RF heating container 2 contains temperature sensitive material capable of generating fluorescence, which can be placed above the light guide port of the light guide 1 at the bottom of the RF heating chamber to receive the excitation light, generate fluorescence with embedded temperature information. It should be noted that the RF heating container 2 does not need to be attached to the light guide 1 because light signals can also be transmitted well in the air. The RF heating container 2 can be made into various sizes and shapes as needed. In another specific embodiment, when the radio frequency heating system is not provided with the light guide 1, the fluorescence temperature measuring transmitter 3 is preferably arranged below the radio frequency heating container 2, as shown in FIG. 1A. The light emitting device and the photoelectric converter device of the fluorescence temperature measuring transmitter 3 are disposed in such a way that a working light path 1' is formed through space between these components and the bottom of the radio frequency heating container 2 (as shown in FIG. 1A) so that light signals can be transmitted in the light path.

Further, as shown in FIGS. 1 and 1A, the radio frequency heating chamber 4 can include a radio frequency generator 9 for generating radio frequency energy and a radio frequency waveguide 10 for transmitting the radio frequency energy to realize radio frequency heating using the radio frequency heating container. It is understood by skilled in the art that the temperature sensitive material at the bottom of the RF heating container 2 could be, but is not limited to, temperature sensitive fluorescent materials such as rubies, alexandrites, etc. It should be noted that the RF heating container 2 can be prepared entirely from the fluorescent material having the temperature-sensitive fluorescent characteristics 8 so that the fluorescent material is uniformly distributed throughout the RF heating container 2. Further, the RF heating container 2 can also contain the fluorescent material only in some parts. Preferably, the fluorescent material is uniformly distributed on the surface of the RF heating container, and more preferably, the fluorescent material is concentrated on the bottom surface of the RF heating container 2.

It will be understood by those skilled in the art that the RF heating system of the present invention can be installed in different types of RF heaters. A radio frequency heater with temperature display and control functions can be obtained by structurally and electrically connecting the radio frequency heater and the radio frequency heating system described herein. A user can place the RF heating container 2 above the light guide port of the light guide 1 at the bottom of the RF heating chamber of the RF heater, and can perform control actions on the control panel 6 placed on the exterior of the RF heater which is operably coupled to the fluorescence temperature measuring transmitter 3 and the central control unit, so that the temperature of the object under test can be measured and controlled. In such an embodiment, one end of the light guide 1 extends into the RF heating chamber and is connected to the RF heating container 2, and the other end is connected to the fluorescence thermometer transmitter 3. In one embodiment, the driving circuit of the light emitting device controls at least one or more of the light intensity, frequency, wavelength or waveform of the excitation light to control the light output mode of the excitation light. Further, the fluorescent temperature measuring transmitter of the radio frequency heating system can be connected to the display device of the radio frequency heater, which can be a liquid crystal display screen (as part of the control panel 6) and can display the temperature measured by the fluorescent temperature measuring transmitter in real time, so as the user could obtain the real-time temperature information and control the radio frequency heating temperature.

The above describes the embodiments of the present invention. And what is needed to understand is that, the present invention is not limited to the specific mode of execution mentioned above, those skilled in the art can transform and modify the embodiments in the range of claims, which doesn't matter the essential content of the present invention.

The invention claimed is:
1. A radio frequency heating system comprising:
a radio frequency (RF) heating chamber;
a radio frequency heating container;
a fluorescence temperature measuring transmitter; and
a central control unit,
wherein:
said central control unit is connected to said fluorescence temperature measuring transmitter, said radio frequency heating container is disposed at the bottom of said radio frequency heating chamber, said radio frequency heating container comprises a fluorescent material having temperature sensitive fluorescent characteristics and is excitable by excitation light to generate fluorescence, and there is a working optical path between said radio frequency heating container and said fluorescence temperature measuring transmitter,
said fluorescence temperature measuring transmitter comprises a light emitting device for generating the excitation light and a driving circuit thereof, an optoelectronic converter component for receiving said fluorescence, and a signal processing output circuit for processing output signals of the optoelectronic converter component, and said central control unit is configured to control said radio frequency heating system according to the temperature measured by the fluorescence temperature measuring transmitter.

2. The radio frequency heating system according to claim 1, wherein the fluorescence temperature measuring transmitter is located below said radio frequency heating container, and wherein light signals are transmitted to and from the fluorescence temperature measuring transmitter through space as the working optical path without any solid light conducting material.

3. The radio frequency heating system according to claim 1, further comprising:
a light guide for transmitting light signal between the radio frequency heating container and the fluorescence temperature measuring transmitter, said light guide is made of a solid light conducting material.

4. The radio frequency heating system according to claim 3, wherein the light guide has a proximal end and a distal end, the proximal end extending into the radio frequency heating chamber and is connected to the bottom of the radio frequency heating container, and the distal end being connected to the fluorescence temperature measuring transmitter.

5. The radio frequency heating system according to claim 4, wherein that the radio frequency heating chamber includes a radio frequency generator for generating radio frequency energy and a radio frequency waveguide for transmitting the radio frequency energy.

6. The radio frequency heating system according to claim 1, wherein the fluorescent material is distributed on the surface of the radio frequency heating container.

7. The radio frequency heating system according to claim 6, wherein that the radio frequency heating chamber includes a radio frequency generator for generating radio frequency energy and a radio frequency waveguide for transmitting the radio frequency energy.

8. The radio frequency heating system according to claim 7, wherein the driving circuit of the light emitting device controls the light output mode of the excitation light by controlling one or more of the intensity, frequency, wavelength and waveform of the excitation light.

9. A radio frequency heater for heating an article comprising:
a radio frequency heating system according to claim 5, wherein the central control unit of said radio frequency heating system is connected to a control panel of said radio frequency heater.

* * * * *